March 15, 1966 P. P. McCALL ETAL 3,240,837
MODIFIED REGENERATION PROCESS
Filed Jan. 24, 1964
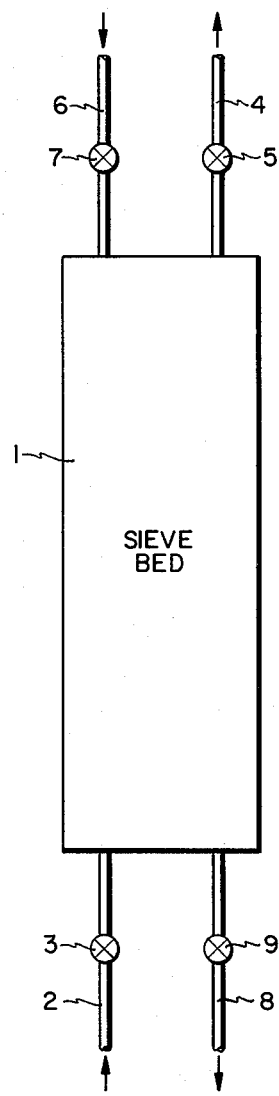
Patrick P. McCall
Donald L. Baeder    INVENTORS
BY
PATENT AGENT United States Patent Office 3,240,837
Patented Mar. 15, 1966

3,240,837
MODIFIED REGENERATION PROCESS
Patrick P. McCall, Madison Township, Middlesex County, N.J., and Donald L. Baeder, Baytown, Tex., assignors to Esso Research and Engineering Company, a corporation of Delaware
Filed Jan. 24, 1964, Ser. No. 339,928
11 Claims. (Cl. 260—676)

This application is a continuation-in-part of our earlier filed application "Regeneration Process," S.N. 223,056, filed Sept. 12, 1962.

This invention relates to a regenerative process for adsorbents. In particular, it relates to a process for regenerating molecular sieves which have lost at least a portion of their adsorptive capacity after use.

In U.S. Patent 2,899,379, it is disclosed that zeolites, either natural or synthetic, have certain crystal patterns which form structures containing a large number of small cavities interconnected by a number of still smaller holes or pores, the latter being of an exceptional uniformity of size. These zeolites are commonly referred to as molecular sieves. They have been described in detail in other publications such as U.S. 2,422,191, U.S. 2,306,610, an article entitled "Molecular Sieve Action of Solids" appearing in Quarterly Reviews, vol. 3, pp. 293-330 (1949), published by the Chemical Society (London) and a book entitled Molecular Sieves, by Charles K. Hersh, and published by the Reinhold Publishing Corporation (1961).

To illustrate the applicability of this invention, reference is made to U.S. Patent 2,899,379. In U.S. 2,899,-379, there is disclosed a process for separating branched chain or aromatic hydrocarbons from normal paraffin hydrocarbons. It is disclosed in this patent that normal paraffins would selectively adsorb on molecular sieves and could be subsequently desorbed by treatment with ammonia at temperatures of about 70° to about 600° F., but preferably below 400° F. The ammonia itself was recovered by heating to 600-800° F.

It has now been found that although ammonia and other displacing agents are very good desorbing agents at the temperature range described above, that after a period of time, usually after many adsorption-desorption cycles, the sieve gradually loses its activity. By activity it is meant the sieve's relative quantitative capacity to adsorb a particular compound. It is not known exactly what causes this loss of activity. Possibly it is caused by poisons in the form of sulfur compounds, carbon dioxide, and the like or by polymerization, coking or other reaction within the molecular sieve.

It has been discovered, and this forms the essence of this invention, that a regenerative step as opposed to a desorption step is most effective in restoring a deactivated sieve to almost its initial capacity. By desorption, it is meant the regular process step or portion of the adsorption-desorption cycle wherein adsorbed materials are desorbed from a sieve in order to effect the particular separation desired.

By regeneration, it is meant the process step of the invention where the sieve is treated under conditions which differ from and which cause different results than occur in desorption. It is thought that the regeneration process of the invention restores a sieve's capacity by removing or otherwise interacting with the sieve to cause removal of a very strongly adsorbed material which is not removed by normal desorption. The art has not generally appreciated the distinction between desorbing and regeneration and the terms are sometimes used interchangeably.

Conventional means of regenerating an adsorbent include purging with an inert gas such as nitrogen or methane or treating the adsorbent with steam at high temperatures and burning with oxygen. These conventional regenerating techniques are too severe for many adsorbents particularly molecular sieves and cause a very marked reduction in sieve life. In contrast, the process of the invention affords excellent regeneration without concomitant loss of sieve life.

In accordance with the present invention, the difficulties and disadvantages inherent in conventional means of regeneration have been overcome. Hitherto, it had been believed that the loss of sieve capacity in processes for normal paraffin recovery was caused by formation of an irreversibly held coke deposit within the pores of a molecular sieve. It was thought that regeneration by burning with air or other means was needed to restore capacity since short cyclic stripping with ammonia at 600° F. as normally carried out in adsorption-desorption cycles for 8–20 minutes failed to restore any significant amount of the capacity loss.

It has now been found in accordance with the present invention that the loss in sieve capacity is reversible and is probably due to a very strongly held material. This strongly held material or deposit is sometimes referred to as a "heel." It is not necessarily the ordinary desorbate. Therefore, it has been found that by regenerating the sieve bed frequently, the rate of capacity loss can be arrested. Regeneration may be under a variety of conditions which differ substantially from the desorption conditions. A regeneration agent is passed through the bed under regeneration conditions. The regeneration temperature may vary from the same temperature as had been utilized previously in desorption to a temperature as much as 400° F. above desorption temperature. A pressure of 1 to 50 p.s.i.a. may be utilized for this regeneration period and the period should be at least one hour and usually last for approximately 1 to 8 hours.

Generally, regenerative agents are displacing agents which are also referred to as displacing medium, desorbents or desorbing agents. The preferred displacing agents are polarizable materials. The especially preferred displacing agents are nonhydrocarbons. Generally, any material that has at least one polar bond and can enter the pores of the desorbent and is preferentially adsorbed under the conditions described herein can be used as a displacing agent. Regenerative agents may be used in either liquid or the gaseous state but it is much preferred to use the gaseous state. A preferred displacing agent has the general formula

wherein $R_1$, $R_2$ and $R_3$ are selected from the group consisting of hydrogen and $C_1$–$C_5$ alkyl radicals. Ammonia is the especially preferred displacing agent with the $C_1$–$C_5$ primary amines being next in order of preference to ammonia. Generally suitable regenerative agents will have a heat of adsorption approximately equal to the material it is desired to desorb. Also displacing agents can be used for both desorption and regenerating depending on the particular process conditions used.

For example, a 5A sieve bed which had been deactivated to 64% of initial capacity in 434 cycles was stripped with ammonia at 850° F. and at 15 p.s.i.g. for 2 hours. After this severe stripping, the capacity returned to 88% of the initial capacity which made it possible to continue the run for an additional 200 cycles without resorting to oxygen burning of the sieve or other conventional regeneration steps. Since oxygen burning of the sieve is the main cause of permanent sieve capacity loss, the use of the technique of the invention can greatly lengthen the life of a sieve. It serves no useful purpose to continually operate the adsorption-desorption cycle on a sieve bed at 800° F. in order to avoid the formation of the strongly adsorbed material which is believed to cause loss of sieve capacity. This is because at 800° F. several undesirable side effects are prevalent. Thus, there is a lower sieve capacity for most feeds; there is cracking which takes place on the sieve which causes sieve degradation as well as degradation of the effluent streams which are cracked and will contain olefins. Also, there is an abnormal polymerization. Therefore, advantageously the sieve is operated at temperatures and other conditions of adsorption and desorption which are best suited for the particular feed being used. This temperature is preferably below 800° F. and will be apparent to one skilled in the art. The traditional desorption temperature utilized is about 645° F. However, this will vary somewhat with a given feed and desorbing agent. When appreciable capacity loss is observed, then the sieve is subjected to the particular regenerative treatment of this invention. It should be further noted that preferably the regenerative treatment is given after the sieve has been desorbed. As a result, the sieve will still contain a desorbing agent or displacing agent on it and will contain only a minimum amount of normally desorbable material which if it were present in larger amounts, would be susceptible to cracking and coke formation at the conditions used in regeneration. Any of the several known materials can be used, preferably displacing agents such as sulfur dioxide, hydrogen sulfide, ammonia, $C_1$–$C_5$ alcohols, glycols, halogenated compounds, nitrated compounds and the like. However, ammonia is the preferred agent.

The following table summarizes the operating, preferred and especially preferred conditions for the process of the invention:

| Regeneration | Operating | Preferred | Especially Preferred |
| --- | --- | --- | --- |
| Temperature, ° F. | 500–1,000 | 700–900 | 750–850 |
| Temperature increase above normal desorption temperature, ° F. | 0–400 | 0–300 | 0–100 |
| Pressure, p.s.i.a. | 0.5–100 | 1–50 | 15–40 |
| Percent Displacing Agent on Sieve on a Weight Basis | 0–10 | 0.1–8 | 0.5–4 |
| Regenerative Agent-Feed Rate, w./w./hr. | 0.05–5 | 0.1–4 | 0.2–2 |
| Time of Regeneration, Hrs. | 1–24 | 1–12 | 1–8 |

The invention is broadly applicable to any adsorbent and particularly to molecular sieves having a pore size above about 4 A. and below about 20 A. Examples of typical sieves include natural zeolites and commercial complex alumino silicates usually referred to as synthetic crystalline zeolites. Examples of natural zeolites include chabazite, faujasite, heulandite and analcite. Examples of synthetic crystalline zeolites include the 4A, 5A, 13X and 10X sieves made by the Linde Company and the "Microtraps" made by Davison Div. of W. R. Grace & Co.

The invention can be more fully understood by referring to both the preceding and following description, the claims taken in conjunction therewith and by the accompanying drawings wherein FIGURE 1 is a schematic of the process of the invention.

Referring now to the drawing. In a conventional process, feed is fed into bed 1 through line 2 which is controlled by valve 3. Sievate comes out of bed 1 through line 4 which is controlled by valve 5. Desorbing material is fed to bed 1 through line 6 which is controlled by valve 7. Desorbate comes off bed 1 through line 8 which is controlled by valve 9. The cycle of desorption and adsorption is continued until the capacity of the sieve falls below a certain desired level, say 75% capacity. Then at the last desorption phase of a cycle, a new cycle commencing with adsorption is not attempted. Instead $NH_3$ at 0 to 25 p.s.i.g., at substantially desorption temperature at a rate of 0.2 to 2 w./w. hr. for a period of 1 to 8 hours is fed through line 6 and valve 7 into bed 1. Highly adsorbed material not desorbed in the conventional desorption part of the process cycle is driven off the bed through line 8 and valve 9 to discard.

The invention is further illustrated by the following examples.

*Example 1*

An adsorption process using 5A molecular seives to recover normal paraffins from a $C_9$–$C_{18}$ virgin distillate from Middle East crude was operated continuously for a period of 434 adsorption-displacement cycles. During this time, the capacity of the adsorbent declined so that the amount of effluent that could be obtained before significant breakthrough of normal paraffins decreased from 0.25 wt. of effluent per wt. of adsorbent to 0.16 wt. of effluent per wt. of adsorbent. Average operating conditions during this period were as follows:

Adsorption:
    Temperature, ° F. _____ 570
    Pressure, p.s.i.a. _____ 1
    Oil feed rate, w./w./hr. _____ 0.6
    Time, minutes _____ 20
Desorption:
    Temperature, ° F. _____ 630
    Pressure, p.s.i.a. _____ 30
    $NH_3$ feed rate, w./w./hr. _____ 0.26
    Time, minutes _____ 20

At the end of the $NH_3$ displacement step of the 434th cycle, the adsorbent temperature was raised to 790–800° F. and $NH_3$ was passed through the bed at 30 p.s.i.a. and about 0.26 w./w./hr. This regeneration operation was continued for 2 hours, during which time a quantity of dark-colored material was recovered from the effluent $NH_3$.

The bed was then cooled to 600° F. and cyclic adsorption-displacement operations as described above were resumed. As the result of the 800° F. regeneration, the adsorbent capacity was raised to 0.22 wt. of effluent per wt. of adsorbent. Thus, the initial effect of the regeneration step was to restore 67% of the capacity that had been lost.

Cyclic operations were continued for another 85 cycles. At the end of this time, the capacity was 0.17 wt. of effluent per wt. of adsorbent. This capacity was still significantly higher than that immediately before the regeneration step. Additional cycles were carried out until the capacity of the adsorbent bed declined to the same level as that obtained immediately before regeneration. This did not occur until over 200 cycles, or 10 days, after the regeneration.

*Example 2*

An attempt was made to operate the cyclic adsorption-displacement process continuously at 800° F. The feedstock in this case was a 320/750° F. virgin diesel fuel. Adsorption and $NH_3$ displacement were carried out at 800° F.

In the first cycle, the capacity of the 5A molecular sieve adsorbent was approximately 0.76 wt. of effluent per wt. of adsorbent. The reason why it was higher than the initial capacity found in the previous example is that the feedstock used in this operation had a lower normal paraffin content, so that more n-paraffin-free efficient was obtained before the adsorbent became saturated with n-paraffins.

However, after displacement with $NH_3$, the capacity obtained on the second cycle dropped to 0.52 wt. of effluent per wt. of adsorbent, a loss of over 30%. This degree of capacity loss did not occur in the 600° F. example cited above until after the 240th cycle. Further investigation revealed that the rapid loss in capacity at 800° F. was caused by cracking and coke formation from the adsorbed normal paraffins due to the high temperature level. Thus, it is apparent that for continuous operation, a lower temperature such as 600° F. is preferred because the deleterious effects of coking are minimized. Therefore, high temperature, e.g. 800° F., regeneration by displacement with $NH_3$ should only be attempted after a previous $NH_3$ treatment at 600° F. to remove as much of the adsorbed phase as possible.

*Example 3*

A sieve bed containing 5A molecular sieve was allowed to operate without regeneration until it was operating at 63% of capacity. At this time the sieve bed was used in an adsorption process to recover normal paraffins from a $C_9$–$C_{16}$ fraction from Texas crude boiling at a temperature of about 350–600° F. The bed was operated continuously for a period of 400 adsorption-displacement cycles. During this period, a small amount of additional capacity loss occurred, resulting in a capacity of about 61.5%. Average operating conditions during this period were as follows:

Adsorption:
  Temperature, ° F. _____ 665
  Pressure, p.s.i.a _____ 5
  Oil feed rate, w./w./h. _____ 5.2
  Time, minutes _____ 7
Desorption:
  Temperature, ° F. _____ 665
  Pressure, p.s.i.a _____ 5
  Ammonia feed rate, w./w./hr. _____ 1.3
  Time, minutes _____ 7

At the end of the ammonia displacement step of the 400th desorption cycle, the adsorbent bed temperature was kept at 665° F. and ammonia was passed through the bed at 5 p.s.i.a. and a feed rate of about 1.7 w./w./hr. This regeneration operation was continued for about 90 minutes during which time a quantity of dark-colored material was recovered from the effluent ammonia.

At this time the bed was again restored to its cyclic operation and it was discovered that the bed had returned to what would be considered substantially initial capacity. That is to say, the bed was now operating at about the 63% of capacity at which it was functioning previous to the last 400th cycle period.

*Example 4*

In this example instead of allowing the bed to be reduced to 63% of capacity before the start of the adsorption process, the same Texas crude was passed through the bed while the bed was operating at substantially 100% of capacity. After 400 cycles, the capacity had been reduced to about 94%, and the bed was regenerated under the same conditions which are utilized in Example 3. The operating conditions of the bed were also identical to those in Example 3. It was found that after 400 cycles, the bed was restored to substantially 100% efficiency for separation.

Although the invention has been described with a certain degree of particularity, it will be understood that numerous variations and modifications can be employed without departing from the spirit of the invention as hereinafter claimed.

What is claimed is:

1. In a process for separating straight chain hydrocarbons from branched chain and cyclic hydrocarbons by selective adsorption and desorption of said straight chain hydrocarbons on a crystalline zeolitic adsorbent, the improvement which comprises periodically contacting said adsorbent, after its adsorptive capacity has been reduced, with a regenerative agent having the formula:

wherein $R_1$, $R_2$ and $R_3$ are selected from the group consisting of hydrogen and $C_1$–$C_5$ alkyl radicals and mixtures thereof, at a temperature 0° to 400° F. higher than the temperature of said desorption, for a period of at least one hour, to thereby at least partially restore said capacity.

2. In a process for separating straight chain hydrocarbons from branched chain and cyclic hydrocarbons by selective adsorption and desorption of said straight chain hydrocarbons on a crystalline zeolitic adsorbent, the improvement which comprises periodically contacting said zeolitic adsorbent after its adsorptive capacity has been reduced with ammonia at a temperature of from 500° to 1000° F., for a period of at least one hour, to thereby at least partially restore said capacity.

3. The improvement of claim 1 wherein said temperature is 0° to 400° F. higher than the temperature of desorption and wherein said desorption is accomplished by contacting said adsorbent with ammonia.

4. In a process for separating straight chain hydrocarbons from branched chain and cyclic hydrocarbons by selective adsorption and desorption of said straight chain hydrocarbons on a crystalline zeolitic adsorbent, said zeolitic adsorbent containing a deactivating amount of a strongly adsorbed contaminant which is substantially non-desorbable at the normal desorption conditions, the improvement which comprises contacting said adsorbent after its adsorptive capacity has been reduced with ammonia for a period of 1 to 8 hours, the said ammonia being introduced at substantially the same temperature as was utilized for desorption to thereby at least partially restore said capacity.

5. The improvement of claim 2 wherein said periodic contact with ammonia is performed at a pressure of 15 to 40 p.s.i.a. and the ammonia feed rate is 0.2 to 2 w./w./hr.

6. A method of regenerating a crystalline zeolitic adsorbent without burning, said zeolitic adsorbent containing a deactivating amount of a strongly adsorbed contaminant, which method comprises contacting said zeolitic adsorbent with a regenerative agent, said regenerative agent having the formula:

wherein $R_1$, $R_2$ and $R_3$ are selected from the group consisting of hydrogen and $C_1$–$C_5$ alkyl radicals, at a temperature of from 500–1000° F. for a period of at least one hour wherein substantially all of strongly adsorbed contaminants are removed.

7. The process of claim 6 wherein said regenerative agent is ammonia.

8. A method of regenerating a crystalline zeolitic adsorbent without burning, said crystalline zeolitic adsorbent having previously been utilized to adsorb desired hydrocarbons and then desorbed with a displacing agent, said displacing agent having the formula:

wherein $R_1$, $R_2$ and $R_3$ are selected from the group consisting of hydrogen and $C_1$–$C_5$ alkyl radicals, and the ability to adsorb hydrocarbons on said crystalline zeolite has deteriorated the improvement which comprises restoring the said zeolite to substantially the same level of adsorptive capacity as it originally possessed by contacting said zeolitic adsorbent for a prolonged period with said displacing agent at a temperature of 500–1000° F.

9. The process of claim 8 wherein said temperature for desorption is substantially the same as the said temperature maintained during regeneration.

10. The process of claim 9 wherein said displacing agent is ammonia.

11. The process of claim 9 where said adsorption, desorption and regeneration take place at substantially the same temperature.

References Cited by the Examiner
UNITED STATES PATENTS 2,818,137  12/1957  Richmond et al. _____ 260—676
2,899,379  8/1959  Wilchinsky et al. _____ 260—676

ALPHONSO D. SULLIVAN, *Primary Examiner.*